Feb. 16, 1965  O. L. ALLEN ETAL  3,169,262
FLOOR POLISHER WITH DOUBLE TOOTHED BELT DRIVE
Original Filed Nov. 9, 1962                                2 Sheets-Sheet 1
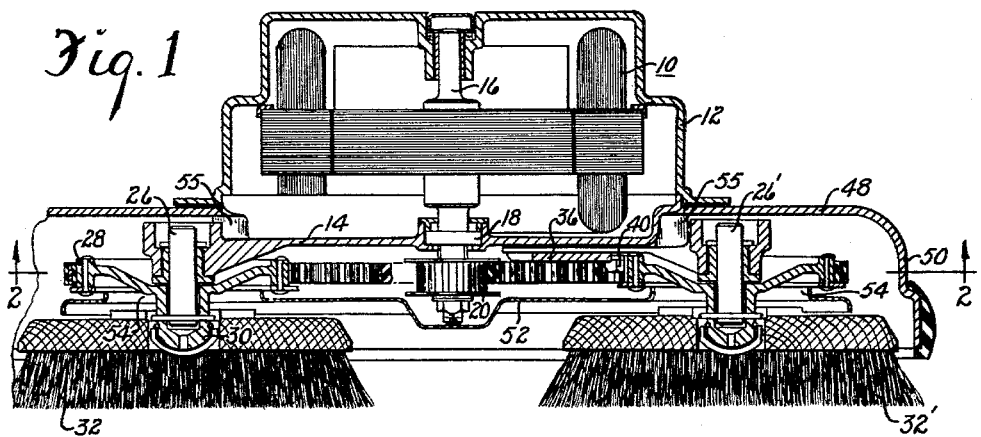
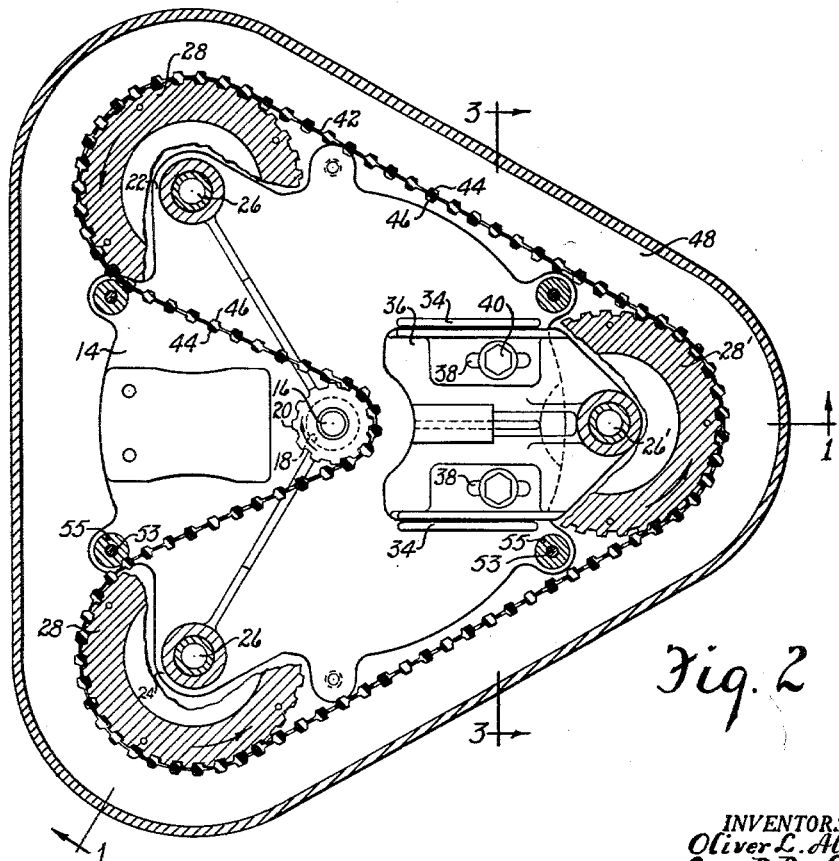
INVENTORS
Oliver L. Allen
Leon P. Borkoski
BY
Thomas C. Botts
THEIR ATTORNEY

United States Patent Office 3,169,262
Patented Feb. 16, 1965

3,169,262
FLOOR POLISHER WITH DOUBLE-TOOTHED
BELT DRIVE
Oliver L. Allen, Riverside, and Leon P. Borkoski, Stamford, Conn., assignors to Electrolux Corporation, Old Greenwich, Conn., a corporation of Delaware
Continuation of application Ser. No. 236,599, Nov. 9, 1962. This application Jan. 7, 1964, Ser. No. 336,195
2 Claims. (Cl. 15—49)

This is a continuation patent application of now abandoned patent application Serial No. 236,599, filed November 9, 1962.

Our invention relates to floor polishers and more particularly to floor polishers of the multi-brush type intended especially for domestic use.

Commercial floor polishers are usually made with one large brush, which has the advantage that by suitable tilting of the device the rotation of this brush may be utilized to cause the polisher to move around on the floor, but the proper control of such a device requires a skillful operator, as otherwise the floor polisher may get out of control and do damage by violently running into objects.

If a floor polisher is provided with a plurality of brushes, usually two or three, it has much less tendency to move about on the floor under its own power and hence is more suitable for use by unskilled operators in homes. If three brushes are employed it is frequently desirable to have one rotate in a direction opposite to that of the other two.

In the past it has been the usual practice to drive the several brushes by means of a belt from a driven pulley mounted on the motor shaft. Originally a flat belt was used, either face of which could engage the several pulleys so as to drive one of the brushes in the reverse direction, as is illustrated in Patent No. 1,799,962 of April 7, 1931. However, this arrangement has the disadvantage that it is almost impossible to avoid belt slippage, particularly with respect to the pulley for the reversely driven brush due to the relatively small arc through which the belt is in contact with this pulley.

More recently a floor polisher has been developed in which a toothed timing belt is used to drive the three brushes, as is shown in Patent No. 2,941,222 of June 21, 1960. However, such belts have heretofore had teeth on only one face thereof, and hence with this arrangement it is necessary that all the brushes rotate in the same direction and that one of the brush shafts also constitutes the driving shaft, thus making it impossible to locate the driving motor symmetrically with respect to the rest of the floor polisher.

In accordance with our invention we provide a floor polisher of the multi-brush type with a toothed belt having teeth on both faces thereof. This makes possible a positive drive of all of the brushes, even though the arc of contact between the belt and one or more of the pulleys may be limited, and consequently it is possible to have one of the brushes rotating in an opposite direction. Also, the driving pulley on the motor shaft may be located in the geometric center of the floor polisher, thus making possible a symmetrical location of the driving motor with respect to the rest of the device.

Further objects and advantages of our invention will appear from the following description when taken in connection with the accompanying drawings, which form part of this specification and of which;

FIG. 1 is a cross-sectional view of a floor polisher in accordance with one embodiment of our invention, and is taken on the line 1—1 of FIG. 2;

FIG. 2 is a cross-sectional view on a somewhat reduced scale taken on the line 2—2 of FIG. 1 and in this view the toothed driven pulleys 28 and 28' are illustrated as being cut-away to allow a clear view of the end plate 14 and the plate 36;

Figure 3:
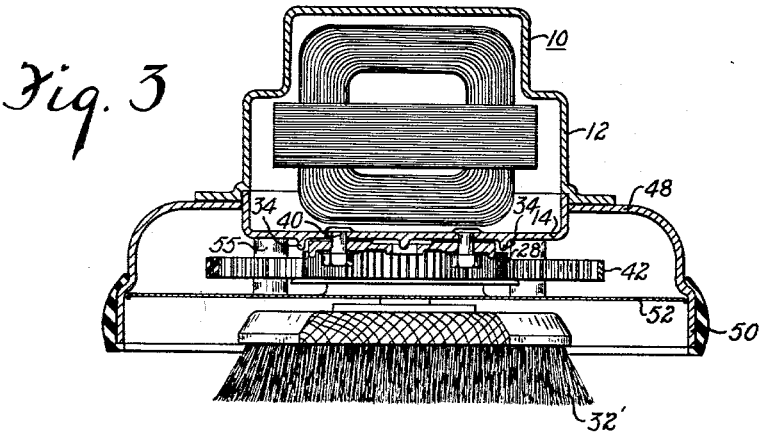
FIG. 3 is a cross-sectional view taken on the line 3—3 of FIG. 2.
Figure 4:
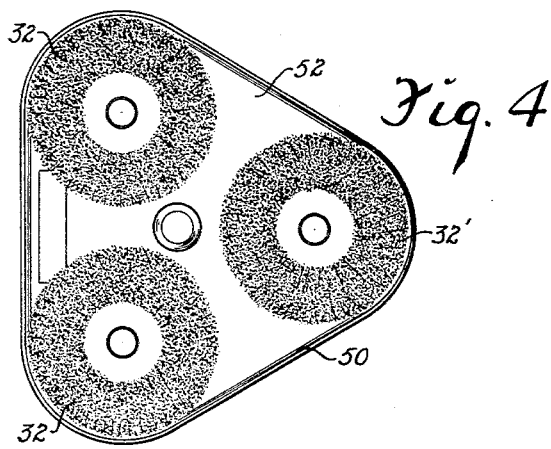
FIG. 4 is a bottom view on a reduced scale of the floor polisher shown in the preceding figures.

Referring more particularly to FIGS. 1 through 4, reference character 10 designates generally an electric motor having a housing including a cup-shaped member 12 and an end plate 14 which end plate also serves as a base member for the floor polisher. The motor 10 has an armature shaft 16 mounted in suitable bearings in the motor housing, the lower end of the shaft extending through the bearing 18 mounted in plate 14, and being provided with a toothed driving pulley 20.

End plate 14 of the motor housing has two extensions 22 and 24 in each of which is rotatably mounted a stub shaft 26. Keyed to each stub shaft is a toothed pulley 28, the central hub 30 of which is adapted to removably support a floor treating element, such as a brush 32.

The stub shafts 26 are located on radii extending from the center of armature shaft 16, which radii are disposed at an angle of approximately 120° from each other. Base plate 14 is formed with a pair of guide rails 34 which are disposed on either side of a radius from the shaft 16 which is disposed at approximately 120° from each of the above-mentioned radii. Slidably mounted between these rails is a plate 36 having slots through which extend bolts 40 which are threaded into the end plate 14. The outer end of plate 36 carries a shaft 26' on which is mounted a toothed pulley 28', the central hub of which carries a surface treating element, such as the brush 32'.

With reference to FIG. 2, it is to be understood that the two toothed pulleys 28 conceal part of the end plate 14 and the toothed pulley 28' conceals part of the plate 36. However, in FIG. 2 the toothed pulleys 28 and 28' are broken away so that a complete view of the plates 14 and 36 is provided.

A flexible transmission belt 42 of suitable length is provided with teeth 44 on one face thereof and similar teeth 46 on the opposite face. As shown particularly in FIG. 2, the teeth 44 engage the toothed driving pulley 18, while the teeth 46 engage the toothed driven pulleys 28 and 28'. The center of pulley 28' may be shifted slightly by moving the plate 36 between the guide rails 34 so as to properly tension the belt 42, but it will be noted that the shafts 26 and 26' are located at the apexes of an isosceles triangle, which is also substantially equilateral and that the driving pulley 18 is located within this triangle and substantially at the center thereof. Consequently, the motor 10 is disposed symmetrically with respect to the remainder of the floor polisher structure.

A triangularly shaped hood member 48 is secured to the motor housing and is provided with a downwardly extending skirt portion 50 which surrounds the pulleys, but below which the brushes 32 and 32' extend so as to contact the floor. A plate member 52 is secured in spaced relation underneath the hood member by bolts 53 and spacers 55. The plate member is disposed below the pulleys and transmission belt so as to guard the latter, as is shown in FIGS. 1 and 3, the member 52 being provided with suitable openings 54 through which extend the shafts 26 and 26'.

In the arrangement described below, the three driven pulleys 28 and 28' will all rotate in the same direction, which is counter to the direction of rotation of the driving pulley 18. It will be noted that the arc of contact between the transmission belt and the different pulleys is substantial, it being a little greater than 180° at pulleys 28 and approaching 180° at pulleys 18 and 28'.

Figure 5:
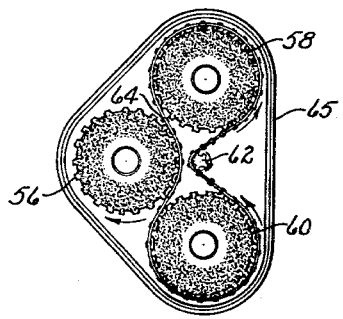
FIG. 5 is a more or less diagrammatical view of a floor polisher in accordance with another embodiment of our invention.

In the embodiment illustrated more or less diagrammatically in FIG. 5 there are three toothed driven pulleys 56, 58 and 60 rotatably mounted about centers which are located at the apexes of an isosceles triangle. However, the base of this triangle between the centers of pulleys 58 and 60 is somewhat greater than the other two sides so as to provide space for a toothed driving pulley 62 therebetween. A transmission belt 64 having teeth on both faces thereof is arranged as shown so that the teeth on one face of the belt engage the driving pulley 62 and the driven pulley 56, while the teeth on the other face engage the driven pulleys 58 and 60. This results in the driven pulley 56 rotating in the same direction as the driving pulley 62, while the other two driven pulleys 58 and 60 rotate in the opposite direction. While the arc of contact between the transmission belt 64 and the pulley 56 is not great, nevertheless slippage is prevented by the positive engagement of the teeth on the belt with those on the pulley. In this embodiment it will be noted that the driving pulley 62 is disposed within the triangle determined by the centers of the shafts carrying the driven pulleys, and the driving pulley is located equidistant from the driven pulleys 58 and 60. This makes possible a substantially symmetrical location of the driving motor on the shaft of which is mounted the driving pulley 62. As in the previous embodiment, a triangularly shaped hood 65 is provided for enclosing the belt and pulleys.

Figure 6:
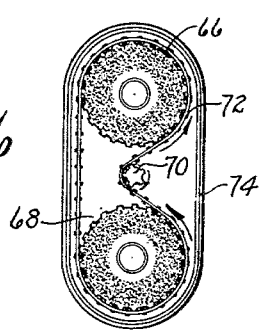
FIG. 6 is a more or less diagrammatical view of a floor polisher in accordance with a still further embodiment.

In the embodiment illustrated in FIG. 6 the floor polisher is provided with a pair of driven pulleys 66 and 68 between which is located a driving pulley 70. The center of the driving pulley is preferably located on a line joining the centers of the two driven pulleys and equidistance therefrom, which results in a symmetrical location of the driving motor on the shaft of which the driving pulley 70 is mounted. A transmission belt 72 having teeth on both faces thereof is arranged as shown in FIG. 6, that is with one face of the belt in engagement with the driven pulleys 66 and 68 and the other face in engagement with the driving pulley 70. It will be noted that the arc of contact between the brush and the driven pulleys is greater than 180°, while that between the belt and the driving pulley 70 approaches 180°, thus assuring a positive drive. In this case the hood 74 is preferably rectangular or oblong.

It will thus be seen that in each case the use of a belt with teeth on both faces thereof makes possible a multibrush floor polisher having a positive drive and with the motor disposed in a symmetrical location with respect to the rest of the device, and if desired one brush may rotate counter to the others while still being positively driven.

While we have shown and described three more or less specific embodiments of our invention, it is to be understood that this has been done for purposes of illustration only and that the scope of our invention is not to be limited thereto, but is to be determined from the appended claims.

What we claim is:
1. A floor polisher comprising: a motor having a vertically-arranged, rotatable, armature shaft; a toothed driving pulley mounted at an end section of said armature shaft for rotation therewith; three toothed driven pulleys mounted on first, second and third vertically-arranged shafts, respectively, for rotating said first, second and third shafts; a plate member having therein a first apertured journal, a second apertured journal and an apertured armature shaft journal for journalling said first shaft, second shaft and armature shaft, respectively, which pass through said apertured journals of said plate member, said plate member including slide rails formed therein; a slidably adjustable element mounted on said slide rails and adapted to be secured to said plate member, said adjustable element having an end section including an apertured journal therein, said end section and its apertured journal extending outwardly beyond said plate member, said end section's apertured journal journalling said third shaft which passes through said apertured journal of said end section; said first, second and end section apertured journals and their respective first, second and third vertically-arranged shafts being situated at the respective apexes of an isosceles triangle, said third shaft being at the apex which terminates the two equal legs of the isosceles triangle, said armature shaft journal and its armature shaft being situated within the triangle at a location which is equidistant from said first and second shafts and their respective journals; a flexible endless belt having teeth on both faces thereof, one toothed face of said belt engaging said toothed driving pulley and the toothed driven pulley supported on said third vertical shaft, the other toothed face of said belt engaging the two driven pulleys which are supported on said first and second shafts, said one toothed face having relatively small arcuate lengths engaging less than one half of the circumferences of said driving and driven pulleys, said other toothed face having relatively large arcuate lengths engaging more than one half of the circumferences of said two driven pulleys, said endless belt having a relatively small amount of tension therein when said driving and driven pulleys are not rotating, said adjustable element being slidable to enable the arranging of said belt on said pulleys and to adjust the tension in said belt; three floor polishing elements, each polishing element being connected to a respective one of the vertical shafts of said driven pulleys for rotation with said shafts; means defining a protective wall between said floor polishing elements and said belt and pulleys, said belt and pulleys being situated between said plate member and said wall defining means.

2. The floor polisher defined by claim 1 further comprising a triangular protective hood connected with edges of said plate member and extending outwardly and downwardly past said wall defining means, and a cup-shaped member which together with said plate member forms a housing for said motor.

References Cited by the Examiner
UNITED STATES PATENTS

| 2,041,748 | 5/36 | Engberg et al. | 15—49 X |
| 2,318,960 | 5/43 | Okuh | 15—49 |
| 2,941,222 | 6/60 | Allen et al. | 15—49 |

FOREIGN PATENTS

| 1,070,189 | 7/54 | France. |
| 6,642 | 6/85 | Great Britain. |
| 180,621 | 8/21 | Great Britain. |

CHARLES A. WILLMUTH, *Primary Examiner.*